US008355118B2

(12) United States Patent  
Ogawa et al.

(10) Patent No.: US 8,355,118 B2  
(45) Date of Patent: Jan. 15, 2013

(54) LASER SCANNER, LASER SCANNER MEASURING SYSTEM, CALIBRATION METHOD FOR LASER SCANNER MEASURING SYSTEM AND TARGET FOR CALIBRATION

(75) Inventors: Kazuhiro Ogawa, Tokyo-to (JP); Hiroto Shibuya, Tokyo-to (JP); Shigeyuki Yamaguchi, Tokyo-to (JP); Ryousuke Miyoshi, Tokyo-to (JP); You Sasaki, Tokyo-to (JP); Hiroyuki Konno, Dublin, CA (US); Jeffrey Robert DeBoer, Livermore, CA (US)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 13/449,389

(22) Filed: Apr. 18, 2012

(65) Prior Publication Data

US 2012/0218546 A1 Aug. 30, 2012

Related U.S. Application Data

(62) Division of application No. 12/653,356, filed on Dec. 11, 2009.

(30) Foreign Application Priority Data

Dec. 25, 2008 (JP) ................................ 2008-331412

(51) Int. Cl.
*G01C 3/08* (2006.01)
*G01P 3/36* (2006.01)

(52) U.S. Cl. ...................... 356/4.07; 356/4.01; 356/5.01; 356/28

(58) Field of Classification Search .................. 356/601, 356/607–608, 614, 625, 4.01, 5.01, 5.13, 356/141.3, 141.1, 4.07, 28; 250/559.19; 382/109, 154

See application file for complete search history.

(56) References Cited

U.S. PATENT DOCUMENTS 5,770,864 A * 6/1998 Dlugos ..................... 250/559.19
(Continued)

FOREIGN PATENT DOCUMENTS

EP 1176393 A2 1/2002
(Continued)

OTHER PUBLICATIONS

Office Action mailed Mar. 8, 2011 in U.S. Appl. No. 11/899,051 (now US 8045762).

(Continued)

*Primary Examiner* — Sang Nguyen
(74) *Attorney, Agent, or Firm* — Nields, Lemack & Frame, LLC (57) ABSTRACT

A laser scanner measuring system is disclosed, which has a laser scanner and a calibration target. The laser scanner comprises a light emitting element for emitting a pulsed laser beam, a rotary projecting unit for projecting the pulsed laser beam, a distance measuring unit, and a control unit for driving and controlling the light emitting element and the distance measuring unit. The calibration target has a reflection sector with a known shape and with high reflectance and is installed at a known position. In use, there is a step for judging a reflected pulsed laser beam from the reflection sector by detecting a level of light quantity, a step for determining a center position of the reflection sector based on the result of the judgment, and a step for calibrating the laser scanner measuring system based on the determined center position and on the known position.

8 Claims, 10 Drawing Sheets

U.S. PATENT DOCUMENTS

| | | | |
|---|---|---|---|
| 5,898,490 A * | 4/1999 | Ohtomo et al. | 356/141.3 |
| 6,115,114 A * | 9/2000 | Berg et al. | 356/5.13 |
| 6,246,468 B1 | 6/2001 | Dimsdale | |
| 6,801,305 B2 * | 10/2004 | Stierle et al. | 356/4.01 |
| 7,576,838 B2 * | 8/2009 | Shirai | 356/28 |
| 7,626,690 B2 * | 12/2009 | Kumagai et al. | 356/141.1 |
| 7,689,032 B2 | 3/2010 | Strassenburg-Kleciak | |
| 7,804,498 B1 | 9/2010 | Graham et al. | |
| 8,045,762 B2 | 10/2011 | Otani et al. | |
| 2003/0137449 A1 | 7/2003 | Vashisth et al. | |
| 2005/0213808 A1 | 9/2005 | Ohtomo et al. | |
| 2006/0188143 A1 | 8/2006 | Strassenburg-Kleciak | |
| 2008/0075325 A1 * | 3/2008 | Otani et al. | 382/106 |
| 2008/0075326 A1 * | 3/2008 | Otani et al. | 382/106 |
| 2010/0256940 A1 | 10/2010 | Ogawa et al. | |

FOREIGN PATENT DOCUMENTS

| | | | |
|---|---|---|---|
| EP | 1544800 A2 | 6/2005 | |
| EP | 1662228 A1 | 5/2006 | |
| JP | 6-214027 A | 8/1994 | |
| JP | 10-308598 A | 11/1998 | |
| JP | 2000-194983 A | 7/2000 | |
| JP | 2002-31528 A | 1/2002 | |
| JP | 2004-37127 A | 2/2004 | |
| JP | 2004-37396 A | 2/2004 | |
| JP | 2004-163292 A | 6/2004 | |
| JP | 2004-317237 A | 11/2004 | |
| JP | 2004-361315 A | 12/2004 | |
| JP | 2005-55311 A | 3/2005 | |
| JP | 2005-283221 A | 10/2005 | |
| JP | 2006-138834 A | 6/2006 | |
| JP | 2008-76303 A | 4/2008 | |
| JP | 2008-82707 A | 4/2008 | |
| WO | 97/40342 A2 | 10/1997 | |
| WO | 01/31290 A2 | 5/2001 | |

OTHER PUBLICATIONS

Notice of Allowance mailed Aug. 5, 2011 in U.S. Appl. No. 11/899,051 (now US 8045762)).

Office Action—Restriction—mailed Apr. 25, 2012 in corresponding U.S. Appl. No. 12/653,356.

Office Action mailed May 9, 2012 in corresponding U.S. Appl. No. 12/653,356.

* cited by examiner

LASER SCANNER, LASER SCANNER MEASURING SYSTEM, CALIBRATION METHOD FOR LASER SCANNER MEASURING SYSTEM AND TARGET FOR CALIBRATION

BACKGROUND OF THE INVENTION

The present invention relates to a laser scanner and a laser scanner measuring system for acquiring three-dimensional data by using GPS (Global Positioning System). The invention also relates to a target for calibration used for the laser scanner measuring system and relates to a calibration method for the laser scanner measuring system.

In recent years, with a widespread use of car navigation system and other related technique, there are increasing demands to have three-dimensional position data and further, three-dimensional image data, which can be used as map data. As a surveying instrument to acquire such type of three-dimensional data, a laser scanner measuring system using GPS and IMU (inertial measuring unit) is currently used. By using a laser scanner, it is possible to acquire an enormous amount of three-dimensional data within short time. Further, a position of the laser scanner is measured by using GPS and also a posture of the laser scanner is measured by using IMU. As a result, it is possible to acquire three-dimensional absolute coordinates on global surface.

In case where three-dimensional data of a construction or a building in urban space is acquired, a laser scanner, GPS, IMU, an image pickup device, etc. are on board of a mobile device such as a vehicle. While the vehicle is driven along a road, three-dimensional distance data on and around the road are acquired by using the laser scanner. Further, a position of the vehicle is measured by GPS at real time. As a result, three-dimensional absolute coordinates can be determined. Further, in parallel to these operations, images are acquired by the image pickup device, and by associating the images with the coordinates data, it is possible to acquire map data with images.

As described above, by using the laser scanner, a large amount of point group data (an aggregate of three-dimensional position coordinates data) can be collected in easier manner. On the other hand, it is very difficult to identify the measured points.

Also, the laser scanner has individual differences caused by error in a manufacturing process, and by error in a process of mounting. Further, when there is environmental change such as temperature change during a process of measurement, a measurement error may occur due to thermal expansion of the device or other causes. Therefore, it is very difficult to verify the measured data and to check an accuracy of the system. In particular, it is more difficult to verify the measured data and to check the accuracy of the system during the measuring operation.

JP-A-2000-194983 discloses a spatial data collecting device, which comprises a distance measuring device, a GPS, an IMU and an image pickup device, and which associates image information from the image pickup device with position information of place where the images are taken and/or road surface information of place where the images are taken, and wherein it is possible to intuitively identify condition of road and condition along the road. Also, a calibration method for calibrating a scanner is disclosed in JP-A-2005-55311, which measures an object to be measured with a known shape by a scanner device and carries out the calibration of the scanner based on a result of the measurement. Further, a surveying system using a laser scanner is described in JP-A-2008-82707.

SUMMARY OF THE INVENTION

It is an object of the present invention to make it possible to identify and check a measured point in easy manner and to carry out calibration of a laser scanner measuring system in simple manner.

To attain the above object, the present invention provides a laser scanner, comprising a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, wherein the control unit judges the object to be measured by detecting a level of light quantity of a reflected pulsed laser beam as received by the distance measuring light receiving unit.

Also, the present invention provides a laser scanner measuring system, comprising a laser scanner and a calibration target, wherein the laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, and wherein the calibration target has a reflection sector with a known shape and with high reflectance, and wherein the control unit judges a reflected pulsed laser beam from the reflection sector as received by the distance measuring light receiving unit by detecting a level of light quantity and determines a center position of the reflection sector based on the result of the judgment.

Further, the present invention provides the laser scanner measuring system as described above, wherein the calibration target is installed at a position to be measured, and by measuring a center position of the calibration target by the laser scanner, the position to be measured is determined.

Also, the present invention provides a calibration method for calibrating the laser scanner measuring system, which has a laser scanner and a calibration target, wherein the laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, and wherein the calibration target has a reflection sector with a known shape and with high reflectance and is installed at a known position, comprising a step for judging a reflected pulsed laser beam from the reflection sector as received by the distance measuring light receiving unit by detecting a level of light quantity, a step for determining the center position of the reflection sector based on the result of the judgment, and a step for calibrating the laser scanner measuring system based on the determined center position and on the known position.

Further, the present invention provides the calibration method for calibrating as described above, which has a laser scanner, a moving object where the laser scanner is installed and at least two calibration targets, wherein the laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, and wherein the at least two calibration targets have a reflection sector with a known shape and with high reflectance and are installed each at a known position, comprising a step for judging a reflected pulsed laser beam from the reflection sector as received by the distance measuring light receiving unit by detecting a level of light quantity, a step for determining a center position of the reflection sector of each of the calibration targets based on the result of the judgment, a step for calculating a distance between the two calibration targets based on the determined center position and a step for calibrating the laser scanner measuring system based on a comparison of the calculated distance between each of the calibration targets with the distance between calibration targets already known.

Also, the present invention provides a target for calibration, which is used for a laser scanner to acquire a point group data by projecting a pulsed laser beam for scanning over a predetermined range and by receiving a reflection light of each pulsed beam, comprising a reflection sector with a known shape with high reflectance, wherein the reflection sector is so designed that the pulsed laser beam is projected at least three points in peripheral region of each edge opposite to each other of the reflection sector.

The present invention provides a laser scanner, comprising a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, wherein the control unit judges the object to be measured by detecting a level of light quantity of a reflected pulsed laser beam as received by the distance measuring light receiving unit. As a result, an object to be measured can be identified in simple manner, and the measured distance can be easily associated with the object to be measured.

Also, the present invention provides a laser scanner measuring system, comprising a laser scanner and a calibration target, wherein the laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, and wherein the calibration target has a reflection sector with a known shape and with high reflectance, wherein the control unit judges a reflected pulsed laser beam from the reflection sector as received by the distance measuring light receiving unit by detecting a level of light quantity and determines a center position of the reflection sector based on the result of judgment. As a result, an object to be measured can be identified in simple manner, and the measured distance can be easily associated with the object to be measured.

Further, the present invention provides a laser scanner measuring system, wherein the calibration target is installed at a position to be measured, and by measuring a center position of the calibration target by the laser scanner, the position to be measured is determined. As a result, it is possible to perform measurement on a specific point where measurement cannot be carried out by a conventional type laser scanner.

Also, the present invention provides a calibration method for calibrating a laser scanner measuring system, which has a laser scanner and a calibration target, wherein the laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, and wherein the calibration target has a reflection sector with a known shape and with high reflectance and is installed at a known position, comprising a step for judging a reflected pulsed laser beam from the reflection sector as received by the distance measuring light receiving unit by detecting a level of light quantity, a step for determining a center position of the reflection sector based on the result of judgment, and a step for calibrating the laser scanner measuring system based on the determined center position and on the known position. As a result, a reflection sector can be specified in simple manner and the center position of the reflection sector can be detected easily by merely detecting the level of the received light without substantially changing the conditions on laser scanner side, and further, calibration of the laser scanner measuring system can be performed.

Further, the present invention provides a calibration method for calibrating a laser scanner measuring system which has a laser scanner, a moving object where the laser scanner is installed and at least two calibration targets, wherein the laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling the light emitting element and the distance measuring unit, and wherein the at least two calibration targets have a reflection sector with a known shape and with high reflectance and are installed each at known position, comprising a step for judging a reflected pulsed laser beam from the reflection sector as received by the distance measuring light receiving unit by detecting a level of light quantity, a step for determining a center position of the reflection sector of each of the calibration targets based on the result of the judgment, a step for calculating a distance between the two calibration targets based on the determined center position and a step for calibrating the laser scanner measuring system based on a comparison of the calculated distance between each of the calibration targets with the distance between calibration targets already known. As a result, a reflection sector can be specified in simple manner and the center position of the reflection sector can be detected easily by merely detecting the level of the received light without substantially changing the conditions on laser scanner side, and further, calibration of the laser scanner measuring system can be performed. Moreover, if the calibration target is installed within a range to acquire point group data, the measurement and the calibration can be carried out in parallel to each other.

Also, the present invention provides a target for calibration, which is used for a laser scanner to acquire a point group data by projecting a pulsed laser beam for scanning over a predetermined range and by receiving a reflection light of each pulsed beam, comprising a reflection sector with a known shape and with high reflectance, wherein the reflection sector is so designed that the pulsed laser beam is projected at least three points in peripheral region of each edge opposite to each other of the reflection sector. As a result, it is possible to detect the shape of the reflection sector and the center position of the reflection sector in simple manner based on the result of detection of the level of the received light quantity of the reflection light.

BRIEF DESCRIPTION OF THE DRAWINGS

FIG. 9 are illustrative drawings, each showing conditions of reflection light when the target for calibration is used;

DETAILED DESCRIPTION OF THE PREFERRED EMBODIMENT

Description will be given below on the best aspect for carrying out the invention by referring to the attached drawings.

Figure 1:
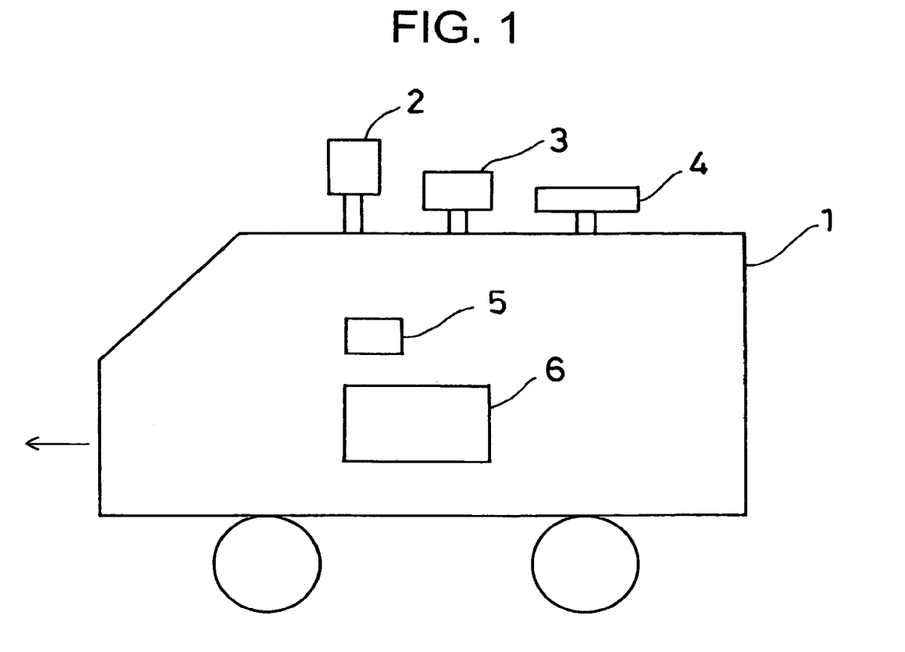
FIG. 1 is a front view of a mobile device to be used in a laser scanner measuring system according to an embodiment of the present invention.
Figure 2:
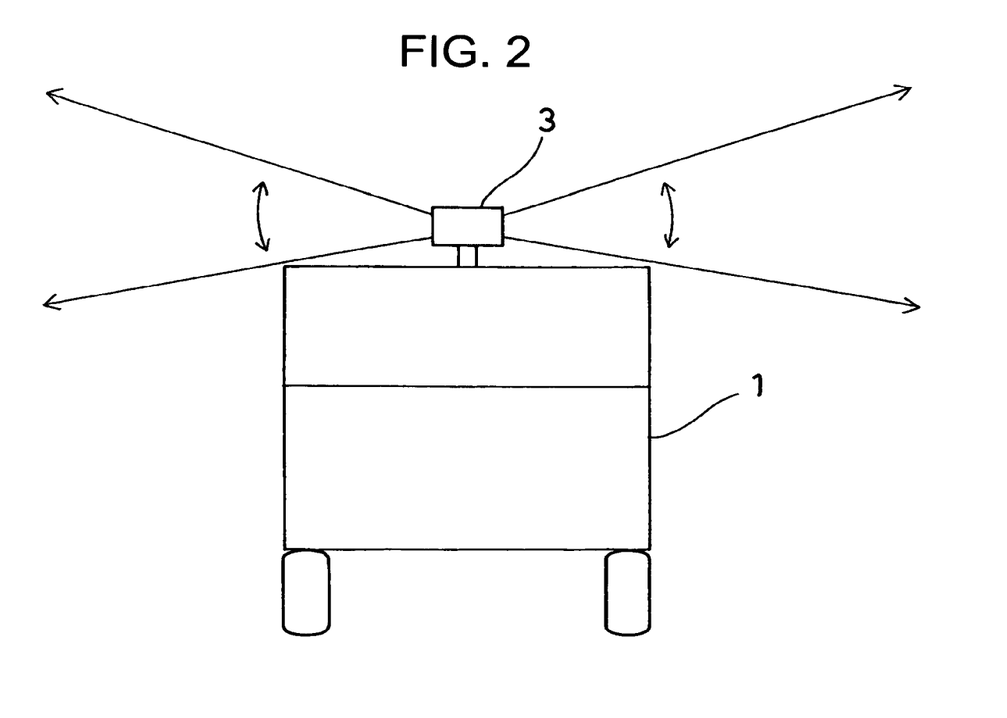
FIG. 2 is a side view of a mobile device to be used in a laser scanner measuring system according to the embodiment of the present invention.

FIG. 1 and FIG. 2 each represents general features of a laser scanner measuring system according to the present invention.

Reference numeral 1 denotes a mobile device such as a vehicle. On the mobile device 1, there are provided devices necessary for acquiring three-dimensional data, i.e. all-azimuth camera 2, a laser scanner 3, a GPS 4, an inertia measuring sensor 5, and a control device 6.

The all-azimuth camera 2 is used to pick up images of sceneries in forward direction and in lateral direction with respect to a driving direction of the mobile device 1 and to output the results as image data. The laser scanner 3 is to project a pulsed laser beam in a direction perpendicularly crossing the driving direction of the vehicle and to acquire a point group data by projecting the pulsed laser beam in vertical direction for scanning. The GPS 4 is to obtain position information from a satellite and to measure a present position of the mobile device 1 (i.e. the position of the laser scanner 3). The control device 6 is to calculate and prepare a three-dimensional coordinates data and a three-dimensional image data based on the data from the all-azimuth camera 2, the laser scanner 3, the GPS 4, and the inertial measuring sensor 5.

Figure 3:
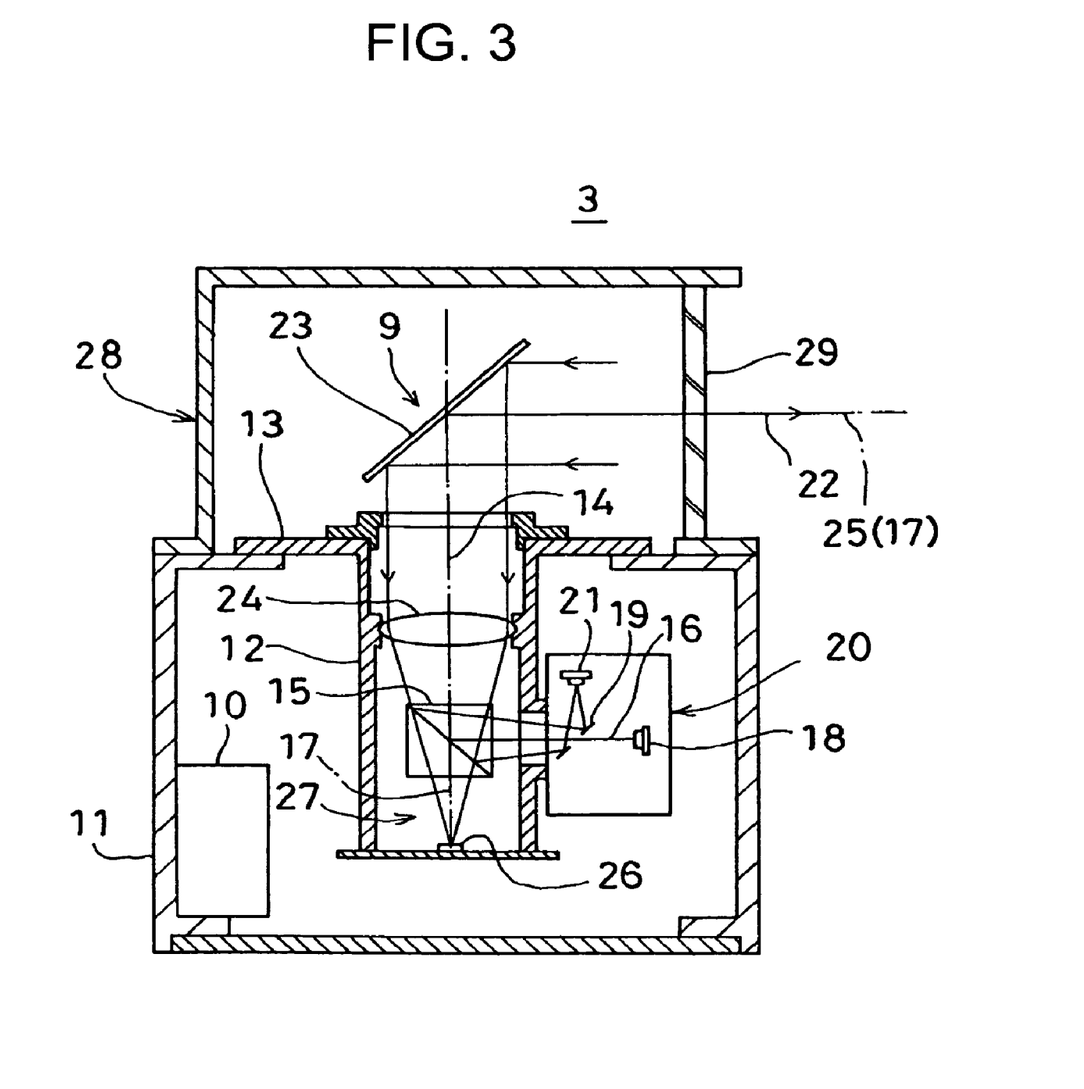
FIG. 3 is a cross-sectional view of a laser scanner, showing an example of the laser scanner to be used in the laser scanner measuring system.
Figure 4:
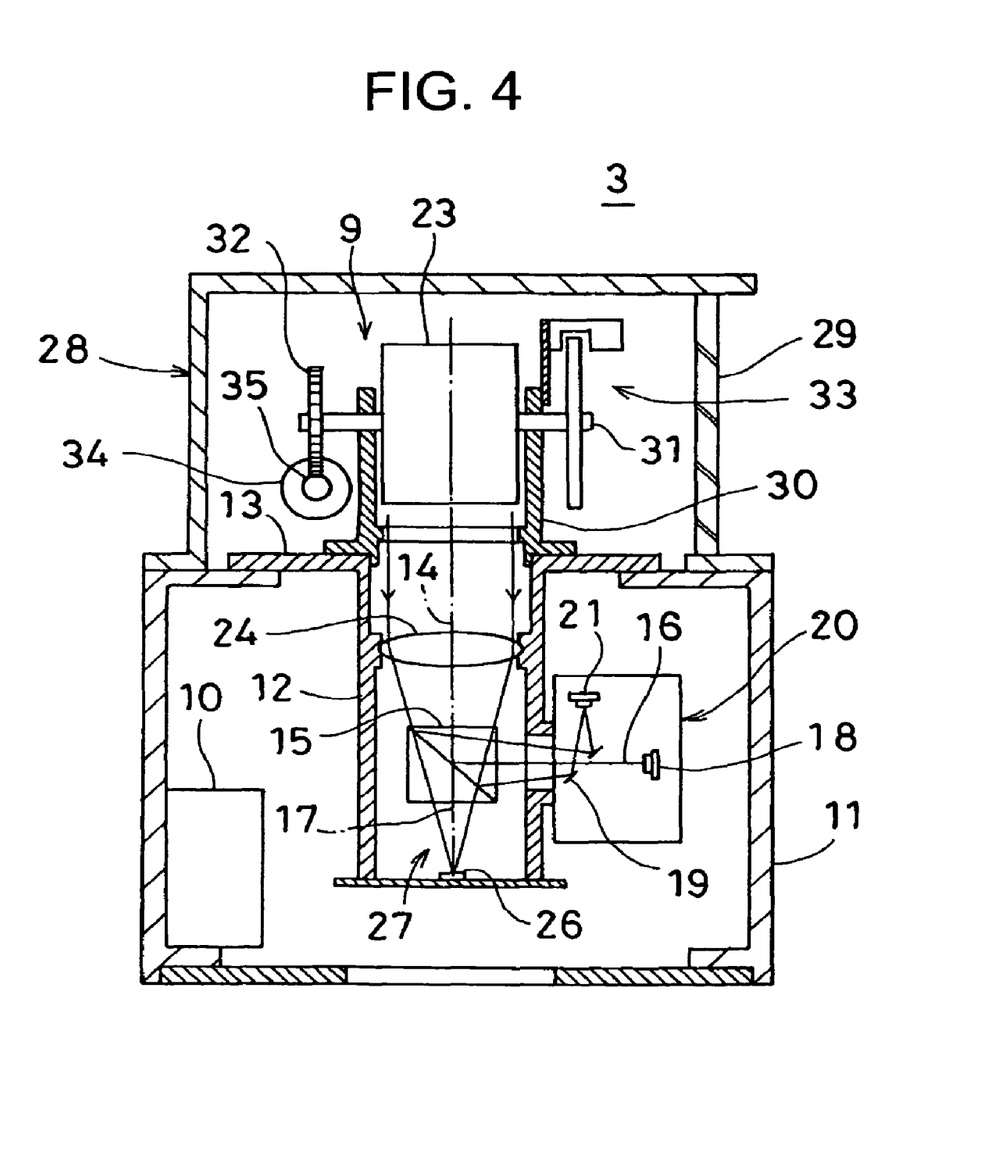
FIG. 4 is a cross-sectional view of a laser scanner, showing an example of the laser scanner to be used in the laser scanner measuring system.

FIG. 3 and FIG. 4 each represents an example of the laser scanner 3 to be installed on the mobile device 1.

Description will be given below on the laser scanner 3. To facilitate explanation, in contrast with FIG. 3, FIG. 4 shows a condition of a rotary projecting unit 9 (to be described later) only as seen from lateral direction.

A body tube (lens barrel) 12 is provided inside a main unit casing 11. The body tube 12 is designed to be concentric to the centerline of the main unit casing 11. The centerline is extending in vertical direction, and the body tube 12 is mounted on the main unit casing 11 by such means as necessary. For instance, a flange 13 is arranged on an upper end of the body tube 12, and the flange 13 is fixed on a ceiling of the main unit casing 11. A control unit 10 for controlling an operation of the laser scanner 3 is mounted at a required position inside the main unit casing 11.

The body tube 12 has an emitting light optical axis 14, which concurs with the centerline, and a beam splitter 15, i.e. an optical splitting means, is provided on the emitting light optical axis 14. The beam splitter 15 allows a visible light to pass and reflects an infrared light. By the beam splitter 15, the light is split from the emitting light optical axis 14 to a reflection light optical axis 16 and to an image pickup light optical axis 17.

A distance measuring unit 20 is disposed on the reflection light optical axis 16.

A light emitting element 18 is provided on the reflection light optical axis 16, and an aperture mirror 19 is disposed on the reflection light optical axis 16. The aperture mirror 19 divides the reflection light optical axis 16, and a distance measuring photodetection unit 21 is provided on the divided light optical axis.

From the light emitting element 18, a pulsed laser beam is emitted. A semiconductor laser or the like is used as the light emitting element 18. An infrared pulsed laser beam is emitted as a distance measuring light 22, and the light emitting element 18 is controlled by the control unit 10 so that the pulsed laser beam is emitted in a condition as required. The pulsed laser beam passes through the aperture mirror 19. Then, the pulsed laser beam is reflected in such a direction toward an elevation rotary mirror 23 by the beam splitter 15 and the pulsed laser beam is projected toward an object to be measured via the elevation rotary mirror 23. The elevation rotary mirror 23 is made of a deflection optical member and is disposed on the emitting light optical axis 14. A condenser lens 24 is disposed on the emitting light optical axis 14. The elevation rotary mirror 23 deflects the emitting light optical axis 14 running in vertical direction to a projecting light optical axis 25, which is running in horizontal direction.

A reflected distance measuring light from the object to be measured is projected toward the distance measuring photodetection unit 21 via the elevation rotary mirror 23 and via the aperture mirror 19. A part of the divided distance measuring light 22 is projected to the distance measuring photodetection unit 21 as an internal reference light (not shown), and a distance to the object to be measured is measured based on the reflected distance measuring light and on the internal reference light.

The light emitting element 18, the aperture mirror 19, the condenser lens 24, the elevation rotary mirror 23, the reflection light optical axis 16, etc. make up together the distance measuring unit 20.

A part of the emitting light axis 14 where the light passes the beam splitter 15 is the image pickup light optical axis 17. An image light receiving unit (an image photodetection unit)

26 is provided on the image pickup light optical axis 17, and the image photodetection unit 26 is positioned at a bottom of the body tube 12.

The image photodetection unit 26 is an aggregate of a multiple of pixels on a flat surface. For example, CCD or CMOS is used as the image photodetection unit, and a position of each pixel is identified with the divided light optical axis as the center. To identify the position of each pixel, X-Y coordinates are assumed with the optical axis, which have the origin on a light receiving (photodetection) surface of the image photodetection unit 26, and the position of each pixel is identified by X coordinate and by Y coordinate. Further, an angle of a light entering the distance measuring photodetection unit 21 is determined by the position of the pixel of the image photodetection unit 26, and the angle is expressed as a field angle.

The elevation rotary mirror 23, the condenser lens 24, and the image photodetection unit 26, etc. make up together an image pickup unit 27.

An image pickup light from the object to be measured enters the elevation rotary mirror 23 along the image pickup light optical axis 17, which concurs with the projection light optical axis 25. After being reflected by the elevation rotary mirror 23, the light passes through the condenser lens 24 and the beam splitter 15 and is received by the image photodetection unit 26, and an image is acquired.

An upper casing 28 is provided above the main unit casing 11, and a light projecting window 29 is formed on a part of a side wall of the upper casing 28. The rotary projecting unit 9 is accommodated inside the upper casing 28.

Now, description will be given on the rotary projection unit 9.

On an upper end of the flange 13, a mirror holder 30 is mounted. The elevation rotary mirror 23 is freely and rotatably mounted on the mirror holder 30 via a rotation shaft 31. An elevation rotary gear 32 is engaged on a shaft end of the elevation rotary mirror 23, and an elevation angle detector 33 is provided on the other shaft end of the rotation shaft 31. The elevation angle detector 33 detects a rotation angle (rotating position) of the elevation rotary mirror 23, and the detected result is sent to the control unit 10.

An elevation rotary motor 34 is mounted on the mirror holder 30, and an elevation rotary driving gear 35 is engaged with an output shaft of the elevation rotary motor 34. The elevation rotary driving gear 35 is engaged with the elevation rotary gear 32.

The control unit 10 is provided inside the main unit casing 11. Light emitting time of the light emitting element 18 is controlled by the control unit 10, and driving of the elevation rotary motor 34 is controlled by the control unit 10. Further, a pulsed emitting light from the light emitting element 18 is controlled in synchronization with a detection angle of the elevation angle detector 33, and the distance measuring light 22 is projected through the light projecting window 29 via the elevation rotary mirror 23. By reciprocally rotating the elevation rotary mirror 23 in vertical direction by the elevation rotary motor 34, the distance measuring light 22 is projected to reciprocally scan in vertical direction at a constant velocity.

Because light emission of the distance measuring light 22 is synchronized with the angle detection by the elevation angle detector 33, a minimum light emission angle interval (light projection resolution) is determined according to light emission interval of the light emitting element 18 (i.e. light emitting capacity), angular velocity of the elevation rotary mirror 23 and responsiveness of angle detection by the elevation angle detector 33, etc. For instance, the minimum light emission angle interval is determined as elevation angle of 1° as a step.

Figure 5:
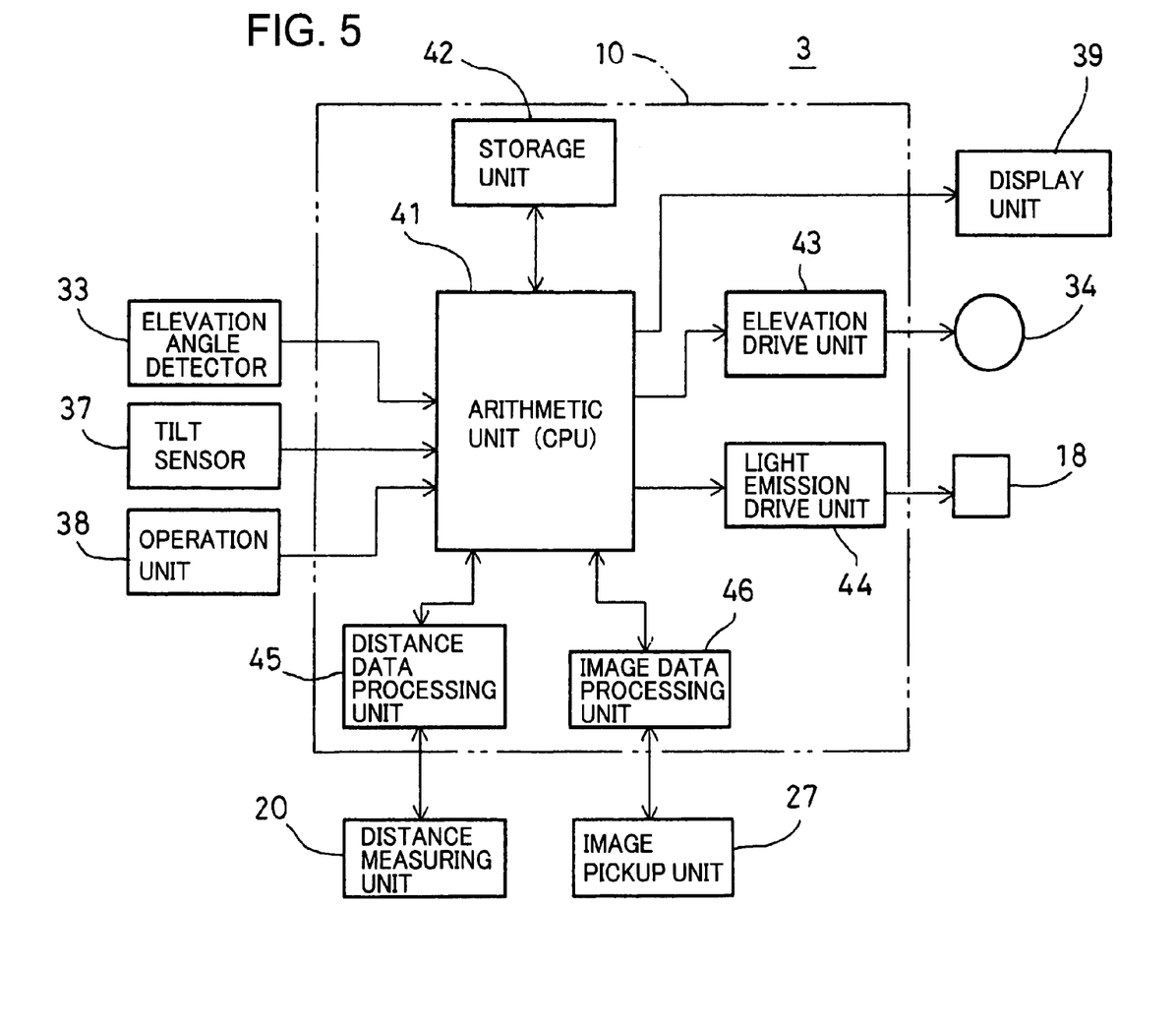
FIG. 5 is a block diagram to show a control system of the laser scanner.

Next, referring to FIG. 5, description will be given on a configuration of a control system of the laser scanner 3.

Signals from a tilt sensor 37 which detects tilting of the laser scanner 3 and signals from the elevation angle detector 33 are inputted to the control unit 10, and a distance measurement data from the distance measuring unit 20 and an image data from the image pickup unit 27 are inputted to the control unit 10. From an operation unit 38, an operator can input the condition necessary for starting the measuring operation of the laser scanner 3 and an instruction to start the measurement operation. The operation unit 38 may be provided in a housing such as on the main unit casing 11, or may be provided separately, or may be a keyboard of a PC.

The control unit 10 drives the light emitting element 18 and the elevation rotary motor 34, and also displays data such as operating conditions, measurement results, etc. on a display unit 39. The display unit 39 may be provided on the main unit casing 11 or may be a display of the PC as given above.

Now, description will be given on general features of the control unit 10.

The control unit 10 comprises an arithmetic unit 41, a storage unit 42, an elevation drive unit 43, a light emission drive unit 44, a distance data processing unit 45 and an image data processing unit 46.

The arithmetic unit 41 is typically represented by CPU.

The storage unit 42 stores various types of programs and further stores measurement data, image data, etc. These programs include: a sequence program for controlling light emission of the light emitting element 18 and for controlling the elevation rotary motor 34 and the like in order to acquire the surveying data necessary to measure distance and to detect the elevation angle and the horizontal angle, a calculation program for calculating the acquired data and for determining distance and three-dimensional data, a distance data program for processing the distance data, a target detection program for detecting a target for calibration from a photodetection level of the reflected distance measuring light and for detecting the center of the target for calibration, an image display program for displaying the data on the display unit 39, and a program for integrally managing the above programs.

The elevation drive unit 43 is for controlling the driving of the elevation rotary motor 34, the light emission drive unit 44 is for controlling light emission of the light emitting element 18, the distance data processing unit 45 is for processing the distance data acquired by the distance measuring unit 20, and the image data processing unit 46 is for processing image data acquired by the image pickup unit 27.

The arithmetic unit 41 carries out the processing as necessary according to the sequence program, the calculation program, the distance data program, the image processing program, the image display program, and the target detection program.

The functions of the distance data processing unit 45 and the image data processing unit 46 may be executed by the arithmetic unit 41. In this case, the distance data processing unit 45 and the image data processing unit 46 may not be used. By providing the distance data processing unit 45 and the image data processing unit 46 separately, distance data processing and image data processing can be carried out in parallel, and thereby it is possible to perform the processings at high speed.

A pulsed laser beam is projected from the light emitting element 18, and distance measurement is performed for each of the pulsed laser beams. The elevation rotary mirror 23 is reciprocally rotated in vertical direction and the pulsed laser beams are projected for reciprocal or rotary scanning in vertical direction, and further, and the mobile device 1 is moved at a predetermined speed. Then, a distance measurement data group (point group data) along both sides of a road in advancing direction can be acquired. Also, the elevation angle is detected by the elevation angle detector 33 for each of the distance measurement data in the point group data. Further, a light emitting time (i.e. the time when the distance is measured) is acquired. At the time of the measurement of distance measuring data, absolute coordinate value of a precise mechanical center can be detected. Each of the distance measurement data is associated with the elevation angle and with the absolute coordinates measuring time, and the result is stored in the storage unit 42.

A pitch of the distance measurement data in vertical (highlow) direction is determined by the rotation speed of the elevation rotary mirror 23 and by the projection time interval of the light emitting element 18, and a pitch of the distance measurement data in horizontal direction is determined by rotation cycle of reciprocal rotation of the elevation rotary mirror 23 and by the moving speed of the mobile device 1.

If angle pitch is set to 1°, for instance, the pitch in vertical direction is about 20 cm at a point 10 meters ahead. If a rotational frequency is 75 Hz and the moving speed of the mobile device 1 is set to 5 kg/h, the horizontal pitch is about 2 cm.

In synchronization with the distance measurement, images along the route are acquired by the image photodetection unit 26 at a predetermined time interval. The images thus acquired are associated with the distance measurement data and the measurement time, and the results are stored in the storage unit 42 or in the control device 6.

When the projecting light optical axis 25 concurs with the image pickup light optical axis 17 as shown in FIG. 3 and FIG. 4 respectively, matching of the distance measurement data with the images can be carried out easily. As shown in FIG. 1, the image pickup unit 27 may be provided independently as the all-azimuth camera 2.

Figure 6:
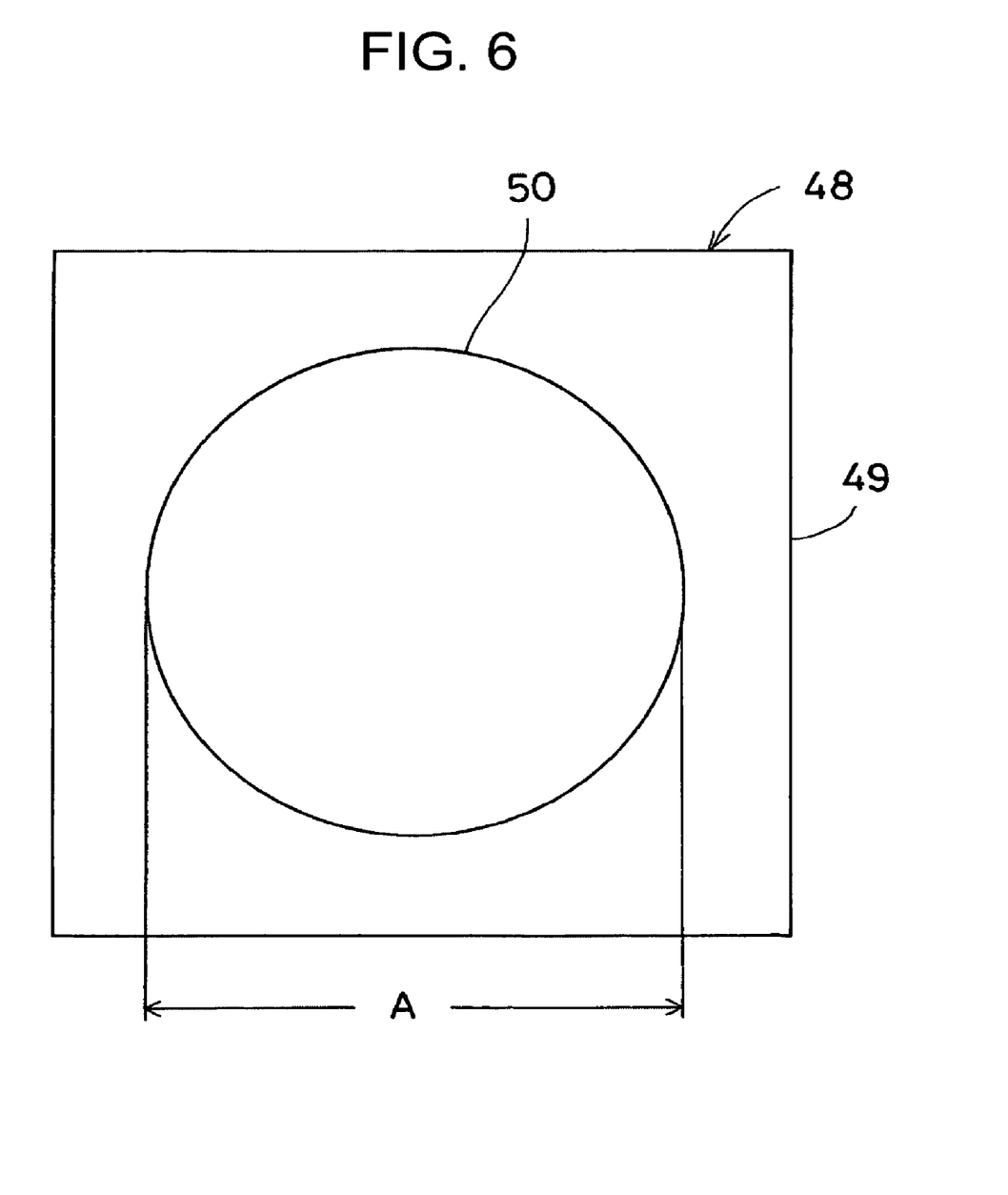
FIG. 6 is a front view of a target for calibration to be used in the laser scanner measuring system according to the embodiment of the present invention.

Referring to FIG. 6, description will be given now on an example of a target for calibration 48.

A reflection sector 50 in circular shape with a known diameter A is prepared on a board 49 designed in a form as required. A reflectance of the reflection sector 50 is extremely higher than the reflectance of a surface of the board 49 or a surface of other natural object (e.g. wall surface of a building). For instance, it is assumed here that the reflectance of the surface of the natural object as given above is ~50%, while the reflectance of the reflection sector 50 is 80%.

As a material to be used for the reflection sector 50, a recursive reflection sheet with micro-prisms distributed on the surface of the sheet is used. The reflectance of the recursive reflection sheet is in the range of 70% to 90%.

Figure 7:
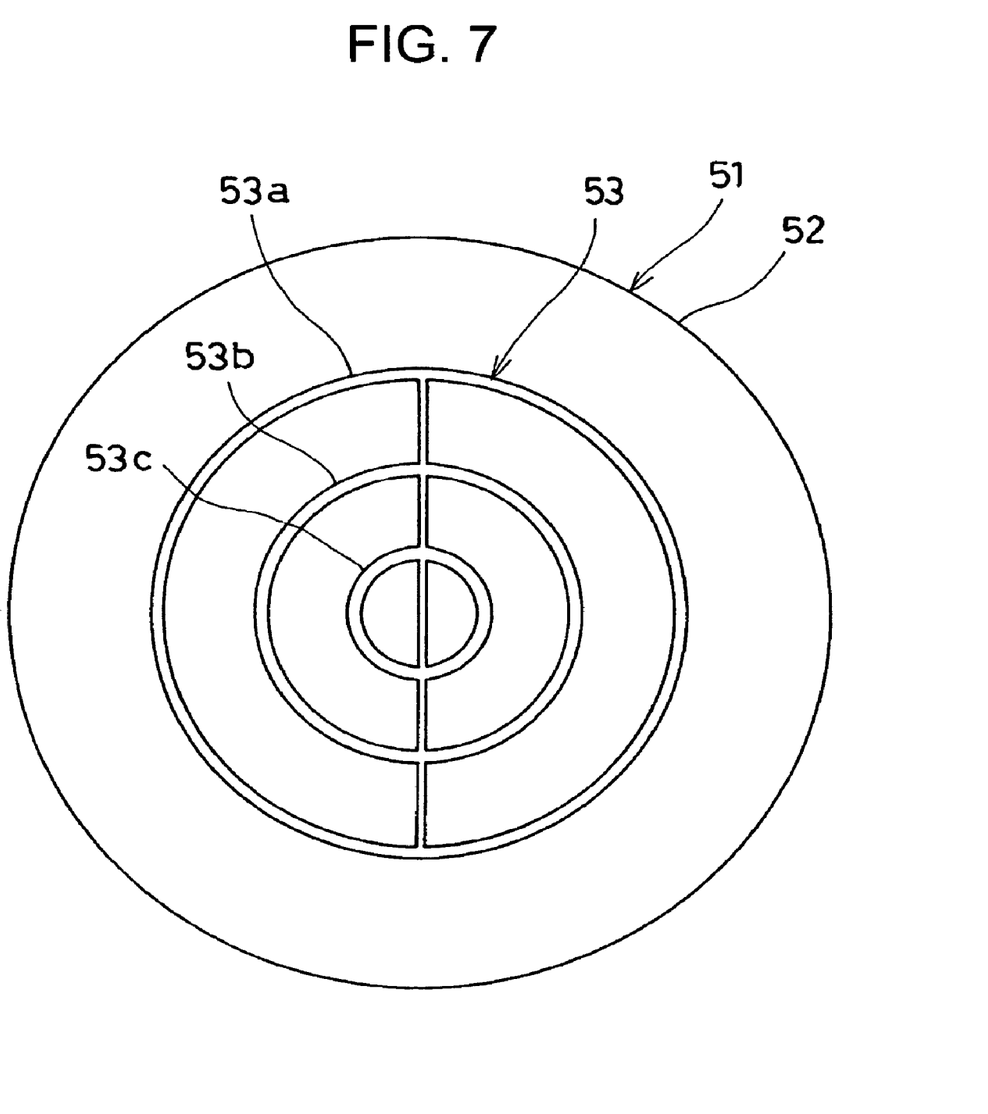
FIG. 7 is a front view of another example of the target for calibration to be used in the laser scanner measuring system according to the embodiment of the present invention.

FIG. 7 shows a calibration target (target for calibration) 51. This calibration target 51 is a board 52 in circular shape where the reflection sectors 53 (53a, 53b and 53c) are arranged in concentric and multi-circular form. For the reflection sector 53 also, a material with high reflectance, e.g. the recursive reflection sheet as used in the calibration target 48, is adopted. Each of the circles has a known diameter.

Now, referring to FIG. 8, description will be given on operation of the laser scanner and the laser scanner measuring system.

First, a calibration target 48a and a calibration target 48b, each having a reflection sector 50 with a known diameter A, are installed each at a known position and at a known interval D in advancing direction of the mobile device 1.

While the distance measuring light 22 is projected for reciprocal or rotary scanning in vertical direction, the mobile device 1 advances at a predetermined speed.

Figure 9A:
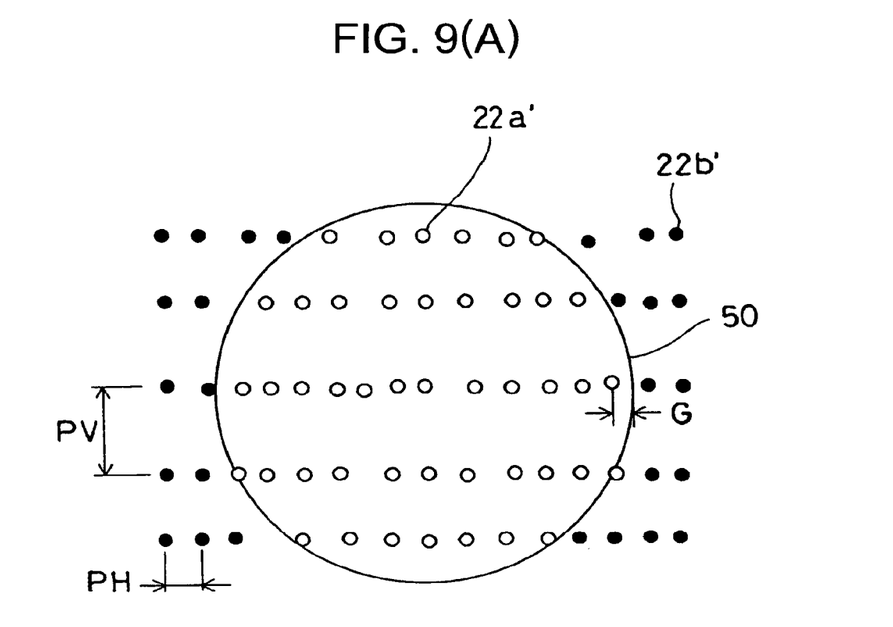
Figure 9B:
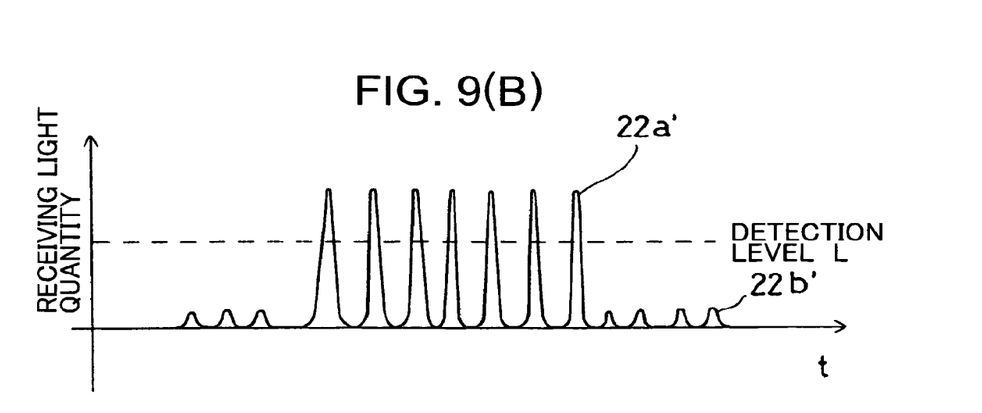

Each of FIG. 9 (A) and FIG. 9 (B) shows a relation between the calibration target 48a and a reflected distance measuring light when the distance measuring light 22 is projected to the calibration target 48a for scanning. Each of black spots and white spots shown in FIG. 9 (A) represents reflected distance measuring lights 22a' and 22b' respectively. As described above, a pitch PV in vertical direction is determined by an angular pitch in elevation direction of the projected pulsed beam, and a pitch PH in horizontal direction is determined by the rotation cycle of the elevation rotary mirror 23 and by the moving speed of the mobile device 1.

Between a case where the distance measuring light 22 is reflected by a portion other than the reflection sector 50 and a case where the distance measuring light 22 is reflected by the reflection sector 50, there is extreme difference in the light quantity of each of the reflected distance measuring lights 22a' and 22b' as shown in FIG. 9 (B). FIG. 9 (B) shows a photodetection signal at the lowest column in FIG. 9 (A).

Therefore, if a detection level L is set to a level sufficiently higher than the photodetection level of the reflected distance measuring light 22b' and also higher than the photodetection level of the reflection light from the surface of a natural object with respect to a photodetection signal from the distance measuring light photodetection unit (photodetector) 21, only the reflection signal from the reflection sector 50 can be extracted. That is, it is possible to detect only the reflection signal from the calibration target 48a.

Further, it is preferable that there are 3 reflection points of the reflected distance measuring light 22a' for each of semicircles, i.e. 6 reflection points in all. Accordingly, the diameter of the reflection sector 50 is set up so that it is possible to acquire the above 6 reflection points by giving consideration on the measurement conditions such as a distance to the mobile device 1, the moving speed of the mobile device 1, an angular pitch in elevation direction, etc. when the mobile device 1 has passed by.

By receiving a reflection light at three points along peripheral edge of the reflection sector 50, a position (shape) of circular arc of the reflection sector 50 can be calculated based on the position of the distance measuring point and on the distance measurement data if it is supposed that the moving speed of the distance measuring light 22 to the calibration target 48a in horizontal direction or the moving speed in vertical direction is already known. Specifically, the position of the center of circle can be calculated from the condition that a distance G between the distance measuring position of the reflected distance measuring light 22a' and a circular arc (circumference) of the reflection sector 50 is G<|PH| for instance, in horizontal direction and that the point to be obtained is positioned on a circular arc of the diameter A.

Therefore, a center position data O1 (three-dimensional position data) of the reflection sector 50 of the calibration target 48a can be determined by calculation.

Similarly, a center position data O2 (three-dimensional position data) of the reflection sector 50 of the calibration target 48b can be determined by calculation.

Further, from the three-dimensional position data of the center position data O1 and the center position data O2, each of a center position interval Da between the calibration target 48a and the calibration target 48b can be determined by calculation.

The center position data O1 and the center position data O2 thus determined include individual error inherent to the laser scanner measuring system. Therefore, by comparing the center position data O1 and the center position O2 with the data of a known position, or by comparing the center position interval Da thus determined with a known interval D, individual error inherent to the laser scanner measuring system can be detected, and based on the detected error, the laser scanner measuring system can be calibrated.

The result of detection of the center position of the reflection sector 50 may be used when an image taken by the all-azimuth camera 2 is associated with the measurement data.

Similarly in case where the calibration target 51 is used (see FIG. 10), when the target calibration target 51 is used, the reflection sectors 53 (53a, 53b and 53c) are directly detected by detecting the level of the reflected light as received.

Figure 10:
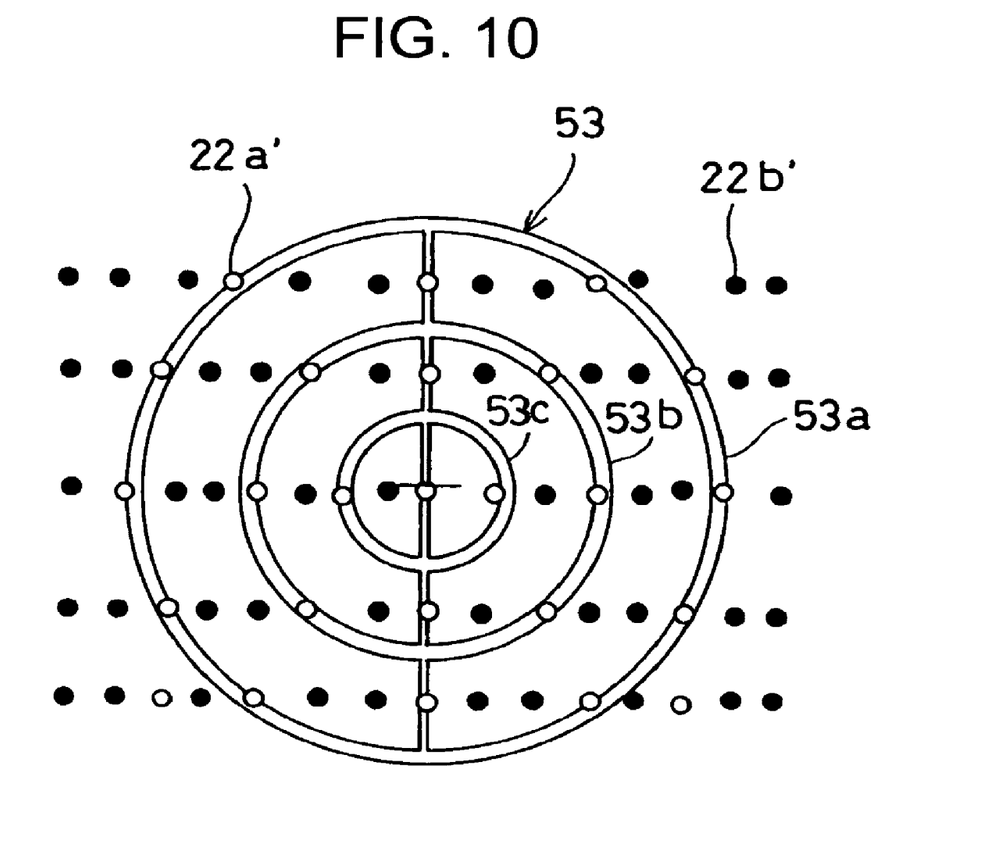
FIG. 10 is an illustrative drawing to show conditions of the reflection light when another target for calibration is used.

The reflection sectors 53 (53a, 53b and 53c) are detected and thereby the center position of the reflection sector 53 can be detected. And, the laser scanner measuring system can be calibrated as described above.

Only the calibration of the laser scanner measuring system may be carried out by using the calibration target 48. Or, by installing the calibration target 48 in the measurement range in advance so that the reflection light from the calibration target 48 can be received during measurement, and the measurement data may be calibrated during the course of the measurement by incorporating a calibration process using the calibration target 48.

If it is so designed that the light emitting element 18 can also detect colors of RGB, the calibration target 48 can be detected, depending on the judgment on hue and color, instead of the judgment on light quantity level.

The form of the reflection sector 50 is not limited to circular shape, and the form may be in elliptical shape or in square or in other form already known. The reflection sector 50 is in such size that the light is projected to at least three points in peripheral region of each of the edges opposite to each other so that the shape of the edge of the reflection sector 50 can be detected from the relation with the scanning pitch of the laser beam.

In the above, description has been given only on the measurement along one side of a road where the mobile device 1 is advancing. If the laser scanner 3, which can perform measurement on the left side and the right side at the same time, the point group data on both sides of the road can be measured at the same time. Also, it may be so arranged that the calibration targets 48 are provided each at three positions or more, and the point group data may be acquired while performing the calibration as appropriate.

When the calibration target 48 is installed in such manner that the center of the reflection sector 50 concurs with the point to be measured, measurement can be made on a specific point, which could not be measured by a conventional type laser scanner measuring system or which could not be measured directly.

Further, if it is so arranged that the laser scanner 3 as described above can be rotated over total circumference with the vertical axis at the center, the point group data can be acquired over total circumference.

Figure 8:
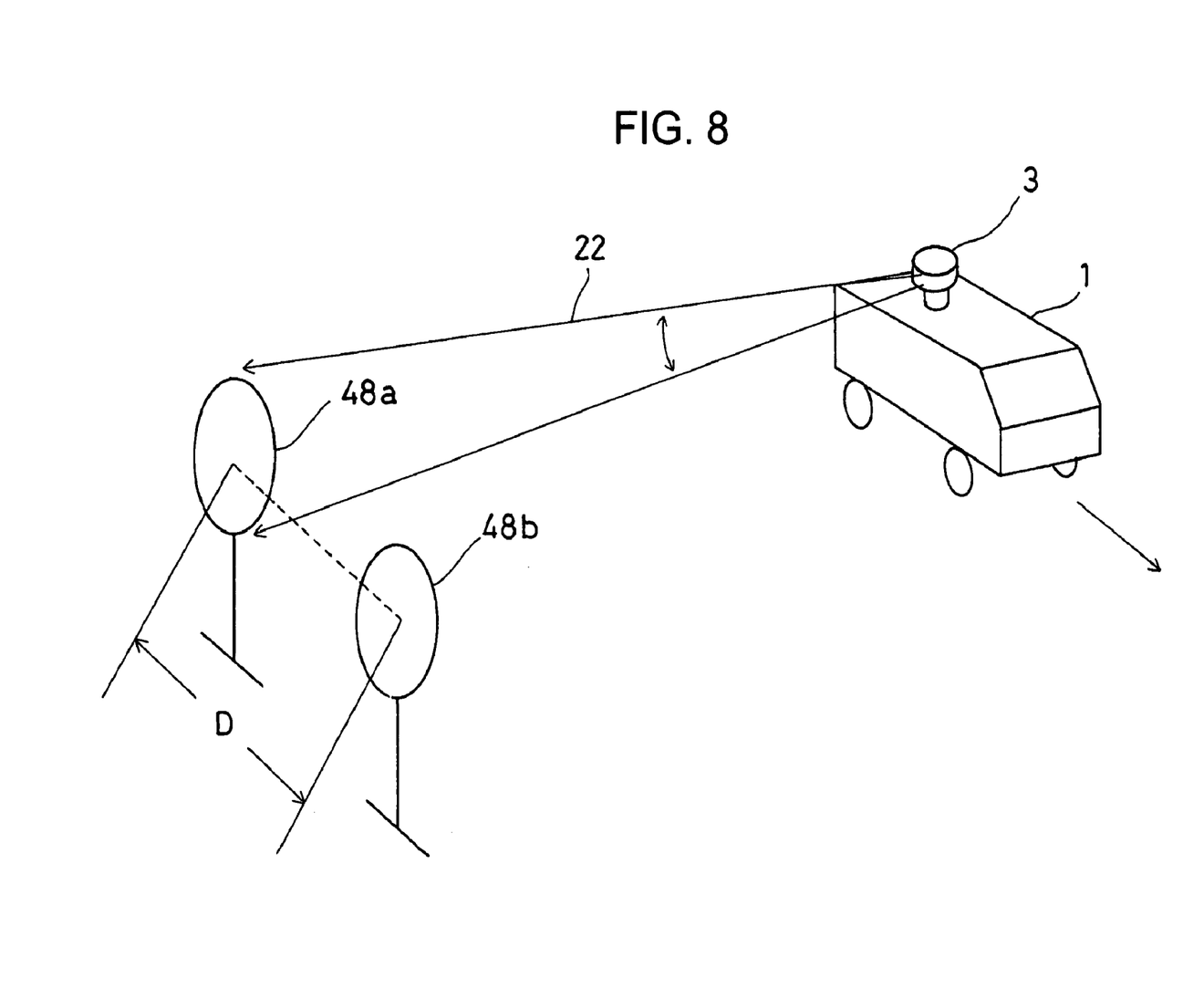
FIG. 8 is a perspective view to show general outline of the laser scanner measuring system according to the embodiment of the present invention.

In the embodiment as shown in FIG. 8, description is given on a case where a calibration target 48 in circular shape is provided on an upper end of a support pillar member, while the calibration target 48 is not limited to the one in circular shape. Also, the calibration target 48 may be integrated with the support pillar member.

Figure 11:
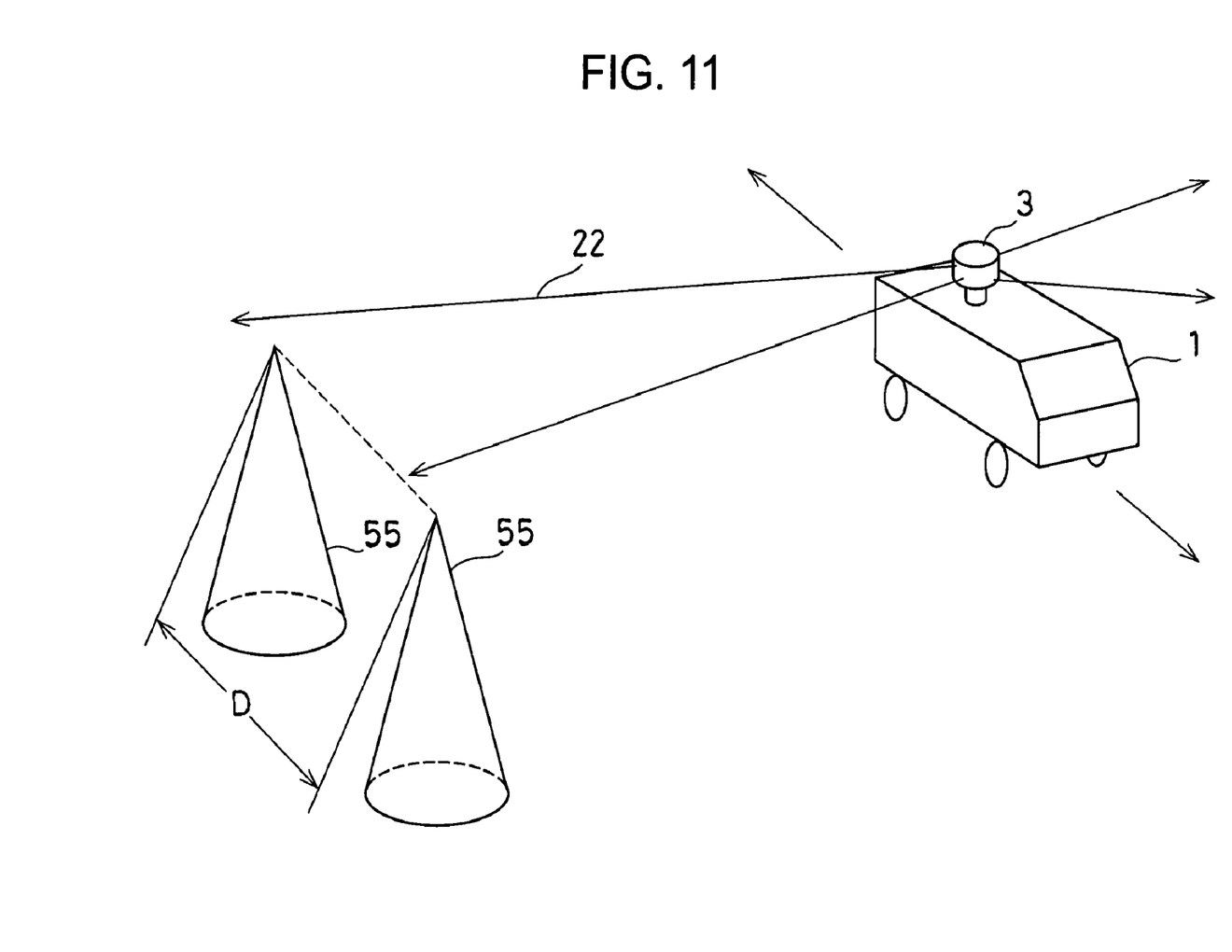
FIG. 11 is a perspective view to show general outline of the laser scanner measuring system using still another target for calibration.

FIG. 11 shows an example of the laser scanner measuring system using a calibration target 55 in another example of the calibration target.

The calibration target 55 is designed on a conical member in form of a cone. In the conical member, a position of a forward end can be accurately confirmed, and the forward end of the cone indicates the center of flat surface of the conical member, and a height of the forward end can also be easily confirmed. Accordingly, the conical member can be used as the calibration target 55 to indicate a reference position.

That is, the calibration target 55 itself is a support member, and the forward end fulfills the function as a calibration target.

For the calibration target 55, a conical member currently marketed may be used, which is used for construction works such as road construction or in case where the range of construction work must be divided.

In order to facilitate easily visual inspection and detection of the forward end of the calibration target 55, a reflection mirror may be mounted at the forward end. Or, a material with high reflectance may be coated on the forward end, or a recursive reflection sheet may be attached. Or, a cap in conical shape, which can be removably engaged with the forward end may be adopted so that the cap may have higher reflectance.

When the scanning by a pulsed laser beam is performed over a predetermined range including the forward end of the calibration target 55 by using the laser scanner 3, it is possible to detect the forward end of the calibration target 55 and to measure the position. Or, by installing two calibration targets 55 at the positions already known and by detecting the positions of the forward ends of the two calibration targets 55, it is possible to calibrate the laser scanner measuring system from the measured distance between the preset distance of the two calibration targets 55 and the measurement distance of the calibration targets 55.

The invention claimed is:

1. A calibration method for calibrating a laser scanner measuring system, which has a laser scanner, a control unit, a moving object where said laser scanner is installed and at least two calibration targets, wherein said laser scanner comprises a light emitting element for emitting a pulsed laser beam, a rotary projecting unit for projecting the pulsed laser beam for scanning, a distance measuring unit, which has a distance measuring light receiving unit, for measuring a distance by receiving a reflection light from an object to be measured, and a control unit for driving and controlling said light emitting element and said distance measuring unit, and wherein said at least two calibration targets have a reflection sector with a known shape and with high reflectance and are installed each along an advancing direction of said moving object at a known position and at a known interval, comprising a step for advancing said moving object at a predetermined speed while said moving object emits said pulsed laser beam, a step for judging a reflected pulsed laser beam from said reflection sector as received by said distance measuring light receiving unit by detecting a level of light quantity in a moving process of said moving object, a step for determining three-dimensional positional data of a center position of said reflection sector of each of the calibration targets based on the result of the judgment using said control unit, a step for calculating a distance between said two calibration targets based on the three-dimensional positional data of the two determined center positions using said control unit and a step for calibrating the laser scanner measuring system based on a comparison of the calculated distance between each of said calibration targets with the known interval.

2. The calibration method according to claim 1, wherein said pulsed laser beam is scanned in a vertical direction and according to the scanning in said vertical direction and the advancing of said moving object, a pulsed light is scanned over a whole surface of said target, and said reflection sector is so designed that said pulsed laser beam is projected at least three points in peripheral region of each edge opposite to each other of said reflection sector.

3. The calibration method according to claim 1 or 2, wherein said reflection sector formed on a board with low reflectance in form of a flat plate.

4. The calibration method according to claim 3, wherein said reflection sector is in circular shape.

5. The calibration method according to claim 3, wherein said reflection sector is in concentric and multi-circular shape.

6. The calibration method according to claim 1 or 2, wherein each of said calibration targets is a conical member in form of a cone, and a forward end thereof is used as a target.

7. The calibration method according to claim 6, wherein a coating material with high reflectance factor is coated on a forward end thereof or a member with high reflectance is provided.

8. The calibration method according to claim 7, wherein a high reflection member in conical shape is removably attached on a forward end thereof.

\* \* \* \* \*